Patented June 8, 1937

2,083,010

UNITED STATES PATENT OFFICE 2,083,010

UREA SYNTHESIS

Harald W. de Ropp, Charleston, W. Va., assignor to E. I. du Pont de Nemours & Company, Wilmington, Del., a corporation of Delaware No Drawing. Application November 22, 1935, Serial No. 51,080

11 Claims. (Cl. 260—125)

This invention relates to the synthesis of urea and more particularly to the synthesis of urea from ammonia and carbon dioxide, or compounds thereof, at elevated pressures and temperatures.

In the commercial synthesis of urea from ammonia and carbon dioxide it is known that one of the most important problems bearing upon economical production thereof is the control of reaction temperatures. Moderate temperatures are desirable inasmuch as high temperature urea synthesis melts are corrosive to materials of construction and, in turn, make more difficult, if not dangerous, the use of the necessary, softer corrosion-resistant metals such, for example, as silver.

On the other hand, the higher the temperatures, the higher may be the yields or percentages of conversion of carbon dioxide to urea. As a consequence it has been the custom, in the past, to select a range of operating temperatures in which yields, pressures and adverse conditions, such as corrosion and the like, could be most satisfactorily balanced.

It is an object of this invention to overcome these disadvantages and to provide an improved method of urea synthesis.

A further object of this invention is to provide a method for lowering the temperatures of urea synthesis without an equivalent lowering of the possible percentages of conversion.

Other objects and advantages of this invention will be apparent from the following specification wherein the details and preferred embodiments of the invention are described.

According to this invention high conversions of reactants to urea, in its synthesis from ammonia and carbon dioxide or compounds thereof, may be obtained by carrying on the synthesis in the presence of formamide. By synthesizing urea in this manner it has been found that at a given temperature, other conditions remaining the same, the yield of urea, or percentage of conversion of reactants to urea, may be markedly increased. It has also been found that by the addition of formamide to the reactants in urea synthesis, actually to the urea synthesis melt, synthesis temperature attained by the melt may be appreciably lowered.

Thus, for example, in a continuous process for urea synthesis from ammonia and carbon dioxide in which a 78% excess of ammonia is utilized over the stoichiometric requirements, it has been found that at an inlet ammonia temperature of 10° C., an inlet carbon dioxide temperature of 80° C. and a percentage of conversion of 80%, a urea synthesis melt of the following composition is obtained:

| | Parts by weight |
|---|---|
| Ammonium carbamate | 15.6 |
| Urea | 48.0 |
| Ammonia | 26.5 |
| Water | 14.4 |
| Total | 104.5 |

If no formamide is added to this melt, in a continuous process of synthesis, the temperature of the melt leaving the autoclave is about 222° C.

However, according to this invention, if 7.8 parts by weight of formamide are added and maintained per 104.5 parts of such a melt as hereinbefore described it is found that the temperature of the melt leaving the autoclave has been lowered to about 214° C. It will be seen that a considerable lowering of the heat of the melt has been accomplished by the addition of relatively small quantities of formamide, also accompanied by less corrosive attack upon materials of construction.

In like manner if increasingly larger amounts of formamide are added and maintained per 104.5 parts of melt, greater temperature reductions are possible without loss of conversion or efficiency. The following table illustrates the effect of formamide addition upon the synthesis temperature attained by the melt:

| Parts added formamide per 104.5 parts by melt | Temperature of melt leaving the converter, °C. |
|---|---|
| None | 222 |
| 7.8 | 214 |
| 15.6 | 206 |
| 23.4 | 200 |
| 31.2 | 194 |

Similarly, at any given temperature the addition of formamide to and maintenance of formamide concentrations in urea synthesis melts has a direct and beneficial effect upon the conversion of ammonia and carbon dioxide to urea. Thus, for example, maintenance of from 1.0 to 2.3 mols of formamide per mol. of ammonium carbamate in a continuous urea synthesis, carried on at 157–160° C., will increase the conversion of reactants to urea from a normal of about 41% to the unexpected percentages of conversion of from 52–55%. The invention should not be limited in any way by the explanation but it is believed that the presence of formamide produces an effect similar to that of a catalyst, i. e., it increases the rate of urea conversion, while at the same time it hydrolyzes to ammonium formate thus removing synthesized water of reaction and speeding the rate of urea conversion.

The following tabulation will illustrate the benefits made possible by this invention, showing as it does the increases in conversion of ammonia and carbon dioxide to urea when adding various proportions of formamide to the urea synthesis:

| Mols formamide per mol. ammonium carbamate | Parts added formamide per 104.5 parts melt (80% conversion, 78% excess ammonia) | Increased urea conversion |
|---|---|---|
| | | Percent |
| 0.1 | 4.5 | 4.6 |
| 0.2 | 9.0 | 6.7 |
| 0.3 | 13.5 | 8.1 |
| 0.4 | 18.0 | 9.3 |
| 0.5 | 22.5 | 10.2 |
| 0.75 | 33.7 | 11.6 |
| 1.0 | 45.0 | 12.5 |
| 2.0 | 90.0 | 13.0 |

The formamide may be added to the urea synthesis melt together with the ammonia, or injected into the autoclave by a separate conduit if desired. I prefer, however, to mix the liquid formamide with the ammonia in amounts such that the desired proportions will exist in the urea synthesis melts as hereinbefore described.

Various changes may be made in the methods and details of this invention without departing therefrom or sacrificing any of the advantages thereof.

It will be understood, in the specification and claims, that by the use of the words "ammonia and carbon dioxide" as raw materials for the synthesis of urea these materials are described as such as well as compounds thereof.

I claim:

1. In a process of synthesizing urea from ammonia and carbon dioxide under urea-forming conditions of pressure and temperature, the step which comprises maintaining the presence of formamide in the urea synthesis melt.

2. In a process of synthesizing urea from ammonia and carbon dioxide under urea-forming conditions of pressure and temperature, the step which comprises adding formamide to the urea synthesis melt.

3. The process of synthesizing urea from ammonia and carbon dioxide under urea-forming conditions of temperature and pressure in the presence of formamide.

4. In a process of synthesizing urea from ammonia and carbon dioxide under urea-forming conditions of pressure and temperature, the step which comprises adding formamide to the urea synthesis melt in the proportions of from about 7.8 to about 31.2 parts by weight of formamide per 104.5 parts of urea synthesis melt.

5. In a process of synthesizing urea from ammonia and carbon dioxide under urea-forming conditions of pressure and temperature, the step which comprises adding formamide to the urea synthesis melt in the proportions of about 23.4 parts by weight of formamide per 104.5 parts of urea synthesis melt.

6. In a process of synthesizing urea from ammonia and carbon dioxide under urea-forming conditions of pressure and temperature, the step which comprises adding formamide together with the ammonia to the reaction zone.

7. In a process of synthesizing urea from ammonia and carbon dioxide under urea-forming conditions of pressure and temperature, the step which comprises adding formamide together with the ammonia to the reaction zone, the amount of formamide added being such that there will be about 7.8 to about 31.2 parts by weight of formamide per 104.5 parts of urea synthesis melt.

8. In a continuous process of synthesizing urea from ammonia and carbon dioxide under urea-forming conditions of pressure and temperature, the step which comprises continuously adding formamide together with the ammonia to the reaction zone.

9. In a continuous process of synthesizing urea from ammonia and carbon dioxide under urea-forming conditions of pressure and temperature, the step which comprises continuously adding formamide together with the ammonia to the reaction zone, the amount of formamide added being such that there will be about 7.8 to about 31.2 parts by weight of formamide per 104.5 parts of urea synthesis melt.

10. In a process of synthesizing urea from ammonia and carbon dioxide under urea-forming conditions of pressure and temperature, the step which comprises adding formamide together with the ammonia to the reaction zone, the amount of formamide added being such that there will be about 23.4 parts by weight of formamide per 104.5 parts of urea synthesis melt.

11. In a continuous process of synthesizing urea from ammonia and carbon dioxide under urea-forming conditions of pressure and temperature, the step which comprises continuously adding formamide together with the ammonia to the reaction zone, the amount of formamide added being such that there will be about 23.4 parts by weight of formamide per 104.5 parts of urea synthesis melt.

HARALD W. DE ROPP.